United States Patent [19]

Inoue et al.

[11] Patent Number: 4,818,453
[45] Date of Patent: Apr. 4, 1989

[54] PROCESS FOR MAKING POROUS RESIN AND MOLDED PRODUCT CONTAINING CONTINUOUS HOLES

[75] Inventors: Saihachi Inoue; Shigeru Kiriyama; Kazuhiro Imada, all of Osaka, Japan

[73] Assignees: Inax Corp., Aichi; I-N Technical Lab, Ltd., Osaka, both of Japan

[21] Appl. No.: 91,707

[22] Filed: Sep. 1, 1987

Related U.S. Application Data

[62] Division of Ser. No. 826,547, Feb. 6, 1986, Pat. No. 4,763,489.

[30] Foreign Application Priority Data

Feb. 13, 1985 [JP] Japan .................................. 60-27239

[51] Int. Cl.$^4$ .............................................. C08J 9/28
[52] U.S. Cl. ...................................... 264/41; 264/45.3; 264/225; 264/337; 521/63
[58] Field of Search .................... 521/63; 261/41, 46.3, 261/225, 337

[56] References Cited

U.S. PATENT DOCUMENTS

| | | | |
|---|---|---|---|
| 3,213,044 | 10/1965 | Wagner | 521/63 |
| 3,669,911 | 6/1972 | Najvar | 521/62 |
| 3,825,506 | 7/1974 | Carter | 521/62 |
| 3,870,666 | 3/1975 | Becker | 523/404 |
| 3,929,685 | 12/1975 | Jung | 521/62 |
| 3,945,964 | 3/1976 | Winton et al. | |
| 4,464,485 | 8/1984 | Kisnima | 521/64 |

FOREIGN PATENT DOCUMENTS

| | | |
|---|---|---|
| 0025139 | 8/1980 | European Pat. Off. |
| 2511587 | 10/1975 | Fed. Rep. of Germany |
| 51-46131 | 3/1974 | Japan |
| 51-13896 | 2/1976 | Japan |

OTHER PUBLICATIONS

Chemical Abstracts vol. 83, No. 22, Dec. 1975, page 1, Abstract No. 180505p.

Primary Examiner—C. Warren Ivy
Attorney, Agent, or Firm—Austin R. Miller

[57] ABSTRACT

A novel manufacturing process of mold containing continuous holes and used for filter materials, gas dispersive materials, and mold materials. By this invention, the epoxy resin mixture including an epoxy compound having one or more epoxy groups in each mole, a hardener which reacts with and hardens the epoxy compound, emulsifiers, water or water-surface active agent, and fillers respectively is used as the molding material. As the emulsifier, at least two kinds of three different kinds of nonionic emulsifiers of 4–8, 8–17, and 11–15.6 HLB respectively are used together.

The molding material is cured to a desired shape to prepare a mold containing continuous holes and for molding, conventional methods such as hardening after casting, for example, are adopted.

16 Claims, 2 Drawing Sheets

PROCESS FOR MAKING POROUS RESIN AND MOLDED PRODUCT CONTAINING CONTINUOUS HOLES

This is a divisional application of parent Ser. No. 826,547 filed Feb. 6, 1988 and now U.S. Pat. No. 4,763,489.

This invention relates to a process for making a porous resin molded product containing continuous holes, which is used for filtering media, gas dispersive materials, and for mold materials, and further relates to a casting mold which contains continuous holes suitable for slip discharge casting.

Porous resin molds containing continuous holes have generally been used as filtering media, gas dispersive materials, and for mold materials. When such molded products are used as filtering media, accurate reproduction of pore diameter and porosity are essential. At the same time, the porous resin molded products containing continuous holes should fully meet the requirements of highly important characteristics such as mechanical properties, dimensional stability, and durability.

The methods for manufacturing porous resin molded products containing continuous holes adopted so far, however, have failed to meet the requirements because of problems as described in the following text. Consequently, porous resin molded products containing continuous holes could be used in a limited range only. When made by the use of a non-organic powder, for example, the molded product is very brittle and is often chipped or cracked upon remolding. As it requires high-temperature baking, large sized molded products become cracked in almost all cases. In the metal powder baking method, even dispersion of the metal powder is difficult to achieve and the pore diameter and porosity tend to be locally homogeneous due to transfer and gathering of the metal powder upon baking. This makes it hard to reproduce the pore diameter and porosity with good accuracy. The method which uses plaster or cement is very handy since molding can be performed by casting. Accordingly, plaster is used popularly as a material for making porous resin molds containing continuous pores. Molds made by using materials that are reactive to hydration, such as plaster and cement, however, have such problems as low durability and low resistance to chemicals. To solve these problems, improvements comprising addition of a synthetic resin or an emulsion or solution of a synthetic resin have been studied. Since even dispersion of the synthetic resin or the emulsion solution is difficult, the improved method is still subjected to major problems such as inferior reproduction of pore diameter and porosity, and contraction of the mold.

Besides the manufacturing methods as mentioned above, another process which uses epoxy resin of water dispersion system is shown in Publication No. 53-2464 of Japanese Patent. As an aliphatic polyamide is used as the hardener, a compound of high fluidity for molding is not obtained unless dispersed with a large quantity of water. Accordingly, it takes a rather long curing time from casting to remolding and the mold is greatly contracted upon heating and evaporation, which causes a serious problem in dimensional stability. When a filter is added for adjustment of the molding mixture to solve the problem, fluidity of the mixture is lowered making casting difficult, the mechanical characteristics of the obtained mold are lowered, and the weight is also increased. Accordingly, this method is applicable only to manufacturing molds of limited shapes and dimensions.

An improved version of the method of Japanese Patent Publication No. 53-2464 is also shown in Japanese Provisional Publication No. 59-71339. The improved method is characterized by the use of aliphatic polyamide as the condensation product of a mono-fatty acid amine used in addition to the polymerized aliphatic polyamide used as the hardener in Publication No. 53-2464, so as to obtain a porous material containing continuous holes of a desired average pore diameter. As the condensation product of fatty acid and amine is used as a hardener, as mentioned above, the epoxy resin slip with these kinds of hardeners must be a water in oil type of emulsion to gain a certain viscosity capable of casting and accordingly, the added quantity of water reaches a high percentage of the epoxy resin slip. This extends the curing time and the mold is greatly contracted, which causes a serious problem in dimensional stability. Another problem is still left unsolved in view of production of a porous article containing continuous holes at a high reproduction accuracy.

In Japanese Patent Publication No. 51-46131, a manufacturing method is disclosed, which is characterized by the use of epoxy resin and a specific and sole emulsifier. As will be seen hereinafter in the examples for comparison, this method has a problem of uneven pore diameter due to unstable dimensions of the obtained porous material. When a filter is used in addition, the emulsion is subjected to water release in the middle of curing because a sole emulsifier does not function to stabilize the emulsion.

Japanese Patent Publication No. 55-19723 shows a method using polymethyl methacrylate of powder form in the main. This method is also subjected to such problems as contraction due to unstable dimensions of the obtained mold as polymethyl methacrylates are used for emulsion polymerization, and lower mechanical properties and heat resistance than the method with epoxy resin. The description of this manufacturing process includes no statement of the embodiment when any filler is used.

On the other hand, slip discharge casting is a method adapted to make hollow molds. By this method, slip is supplied into the cast space of a casting mold which can be separated and has continuous pores. The slip is pressed to discharge water content in the slip outside the casting mold, and the solid matter is deposited inside the casting mold. Then the casting mold is separated to obtain a hollow mold. If the casting mold for this method is made of plaster, its durability and resistance to chemicals are inferior. If the mold is made by the method of Japanese Patent Publication No. 53-2464, on the other hand, the problem of unstable dimensions results. For manufacturing a mold, therefore, either method is unfavorable and a more suitable casting mold to slip discharge casting has long been desired.

SUMMARY OF THE INVENTION

The manufacturing process for making a porous resin mold containing continuous holes is a method of obtaining a mold of the homogeneous and continuous pores, excellent dimension stability, mechanical properties, and durability by casting molding. The purpose is realized by using the epoxy resin mixture as the molding material, whcih contains respectively an epoxy compound having one or more epoxy groups in one molecule and a hardener which reacts with and hardens an epoxy compound having one or more epoxy groups in one molecule and an epoxy, the emulsifier being made of at least two kinds of three different nonionic emulsifiers having HLB values (hydrophile-lipophile balance) values of 4-8, 8-17 and 11-15.6 respectively, water or water surface active agent, and a filler respectively.

The casting mold of this invention is a mold suitable for slip discharge casting to obtain a molded product homogeneous and continuous pores, excellent dimensional stability, mechanical properties, durability, and resistance to water. The purpose is realized by making the mold with a holding material which contains an epoxy compound having one or more epoxy groups in each mole and a hardener which reacts with and hardens the epoxy compound, nonionic emulsifiers of three different kinds with hydrophile-lipophile balances of 4-8, 8-17, and 11-15.6 respectively, water or a water surface active to 50 parts by weight of hardener to 100 parts by weight of epoxy compound, 30 parts by weight or less of emulsifiers to 100 parts by weight of hardener in total, 1 to 200 parts by weight of water or water surface active agent, and 30 to 75 weight percent of filler in the mixture of molding respectively.

DETAILED DESCRIPTION OF THE INVENTION

Figure 1:
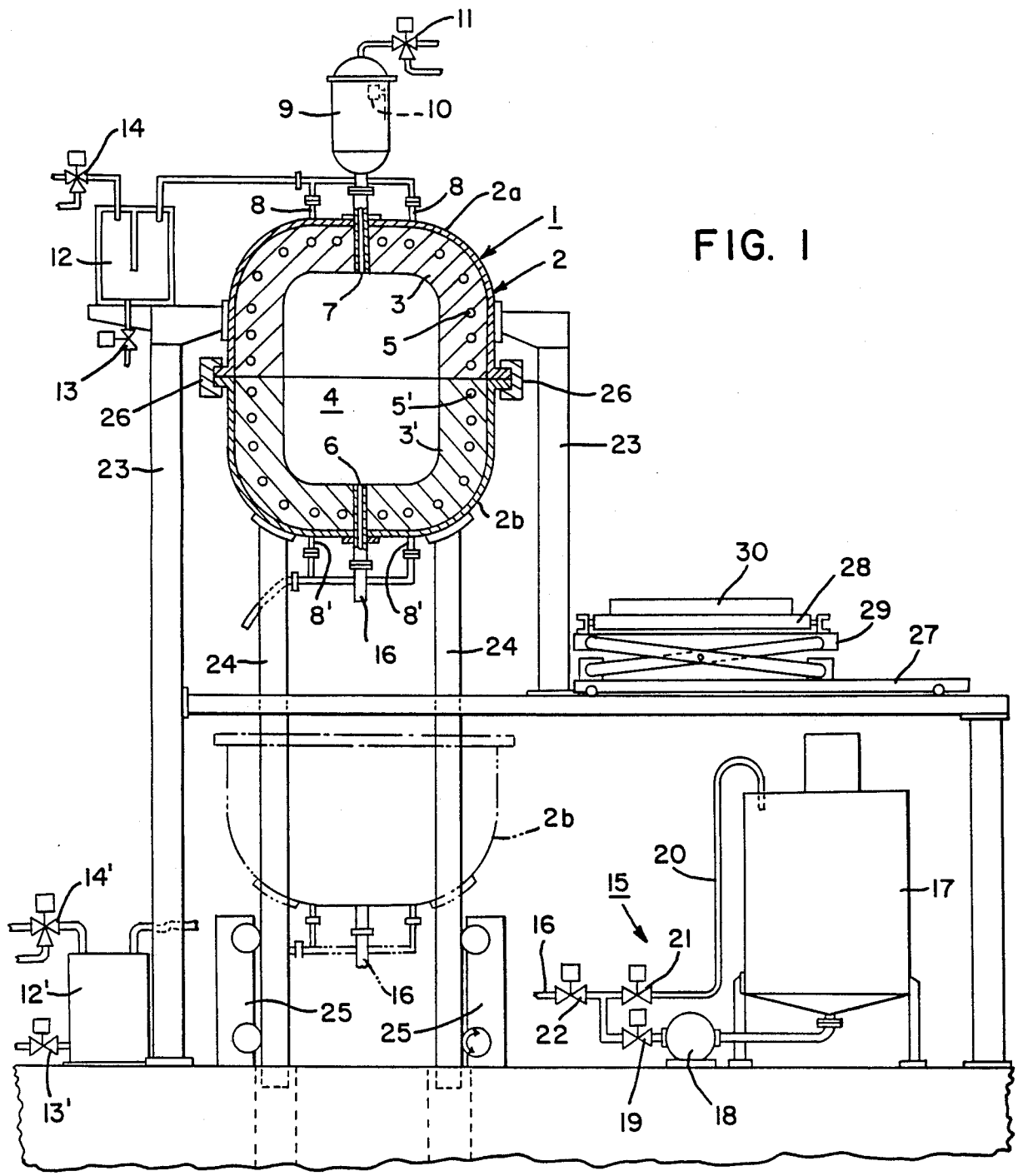
FIG. 1 is a sectional view of a part of the slip discharge casting mold.

As described earlier, an epoxy compound having one or more epoxy groups in the molecule is used to make the resin mold containing continuous holes. As the epoxy compound, a diglycidyl ether of the bisphenol A type or of the bisphenol F type is generally considered advantageous. When molds with high resistance to chemicals and heat are required, in particular, it is advisable to use a polyfunctional epoxy resin such as polyglycidyl ether derived from phenolic novolak or from cresol novolak or triglycidyl ether of trimethylol propane (TMP), glycidyl ester from such acid anhydrides as vinylcyclohexane dioxide, tetrahydro-phthalic anhydride (THPA), and hexahydro-phthalic acid (HHPA), or a heterocyclic epoxy resin such as an epoxy resin of hydantoin base. As the epoxy compound applicable to flexibility or viscosity control a mono or diglycidyl ether or ester generally called a reactive diluent or plastic epoxy resin, such as fatty glycidyl ether represented by butyl glycidyl ether, aromatic glycidyl ether such as cresyl glycidyl ether (CGE) phenyl glycidyl ether, glycidyl ether derived from high grade alcohol and glycol, and glycidyl ester derived from fatty acid may be used. Where molds of particularly high incombustibility are required, an epoxy resin may be used which contains Br in the molecules may be used, such as tetrabromo bisphenol A diglycidyl ether and dibromo phenyl (or cresil) glycidyl ether.

In the manufacturing process such epoxy compounds as stated above may be used independently or several kinds may be added into a mixture as required. The epoxy compound is referred to as the resin component hereinafter.

The applicable hardener includes an aliphatic polyamine such as diethyl triamine (DETA), triethylene tetraaimine (TETA), m-xylylene diamineter (m-XDA) and trimethyl hexamethylene diamine (TMD), alicyclic polyamine such as Isophorone (IPD), N-aminoethyl piperazine and Imidazole compound, aromatic polyamine such as Diaminodiphenyl methane (DDM) Diamono-diphenyl sulfone (DADPS) and m-phenylenediamine, polyamides such as the polycondensate of basic acids and polyamines, and others. Such compounds may be used independently or several kinds may be mixed for use as required. The polymer polycondensate, or reactant of the above mentioned compounds used independently or as a mixture of two or more kinds with at least any one of formalin, acrylic acid, polyols, phenols, polyesters, oxides, mono or di or polyglycidyl ether may be used as the hardener. Preferred hardeners are the reactants of independent or compounds of amines or amides with glycidyl ether and polyphenol, or polycondensates with basic acids and formalin. The reactants of aliphatic polyamine, glycidyl ether, and polyphenol, the reactants of aliphatic polyamine, aromatic polyamine, glycidyl ether and polyphenol, and the reactants of dicyandiamide, aliphatic polyamine, glycidyl ether, and polyphenol are also suitable as hardeners used for the present invention.

Following now is the description of the emulsifiers.

It is well known that epoxy resin mixtures can be emulsified by using an adequate quantity of a selected emulsifier. Within the knowledge of the inventors, however, the object of the invention, which is to obtain a mold having homogeneous holes and porosity and excellent dimensional stability and mechanical strength, can hardly be realized by using any known emulsifier independently, such as the copolymers of polyoxyethylene, polyoxypropylene, and block copolymers such as $HO(CH_2CH_2O)_l$—$[CH(CH_3)CH_2O]_m$—$(CH_2CH_2O)_nH$ , for example, disclosed in Japanese Patent Publication No. 51-46131. As a result of continued study of the emulsifiers which can realize the objects of the present invention, we have found that the advantages of this invention are realized by combining at least two kinds out of three kinds of nonionic emulsifiers with hydrophile-lipophile balances (HLB) of 4-8, 8-17, and 11-15.6 respectively. Sorbitan aliphatic ester is a favorable example of a 4-8 HLB emulsifier, polyoxyethylene oleyl ether is a good example of an 8-17 HLB emulsifier, and polyoxyethylene sorbitan aliphatic ether is a desirable example of an 11-15.6 HLB emulsifier. At least two kinds of these must be used together, and it is more advantageous to use three kinds respectively having HLB values of 4-8, 8-17, and 11-15.6. It is still better to use three kinds including sorbitan aliphatic esters, polyoxyethylene oleyl ethers, and polyoxyethylene sorbitan aliphatic esters altogether. In using the resin components and hardeners described above, it is most favorable to set the HLB of the compound emulsifier at 13 to 14.5. The hydrophile-lipophile balance of the emulsifier used for the present invention is not in line with the commonly accepted emulsifiers of 4-6.5 HLB in preparation of water-in-oil type epoxy emulsions.

It is also preferable that the emulsifier used for the present invention be added to either one or both of the resin component and hardener, and has a high storage stability even under conjugate conditions with the resin component and hardener component, as the emulsifier is easier to use when mixed with the resin component or the hardener in advance.

The quantity of emulsifier to be added should preferably be 30 parts by weight or less, to a total weight 100 for the resin component and the hardener, and 2 to 15 parts by weight per 100 are still better.

The quantity of water or water-surface active agent solution to be added for the present invention should preferably be 1-200 parts by weight to the total weight of 100 of the resin component and hardener, and 10-80 parts by weight per 100 are still better. Two component type emulsions such as epoxy resin are subjected to water release when over a fixed quantity of filler is added, as the filler is coagulated again or the colloid is broken quickly depending on the kind of the filler. The phenomenon of water release presented in some specific kinds of fillers is publicly known and to prevent water release, a surface active agent is used as required. The surface active agent used for the present invention includes not only typical surfactants but also agents for improving solution of fillers such as dispersants of agueous pigments in water. The surface active agent improves wetting of fillers with water and also functions as a protective colloid. On checking various kinds, the surface active agents of the fluorine series have been found most effective. Examples of fluorine series surface active agents are fluorochemical surfactants derived from hexaluoropropene oligomers, and nonionic fluorochemical surfactants of the fluoroalkyl polyoxyethylene type. The quantity of surface active agent to be added may be changed adequately according to the quantity of filler, but 30 parts by weight or less to 100 parts by weight of water is preferably, and less than 10 parts by weight is still better. When the kind and added quantity of the filler are fixed, a fixed quantity of surface active agent may be added before to the resin component or the hardener, as required. Now follows a description of the fillers.

The kind of filler, particle size, and added quantity are factors which greatly affect the characteristics of the mold, besides the quantity of water to be added. The types of fillers used for the present invention are not particularly limited so long as they are of the type ordinarily used for modification of synthetic resins. For example, silica sand, quartz sand, calcium carbonate, talc, barium sulfate, clay, or aluminum hydroxide may be used and pigments such as titanium oxide and chromic oxide are also used. Dolomite and ceramic powder may also be used. Inorganic fillers such as alumina, glass beads, pearl sand and Ottawa sand, and organic fillers like phenol resin spheres and epoxy resin spheres may be used. Fillers of certain particle ranges such as 60-100 mesh, 100-200 mesh, 200-300 mesh or smaller than 300 mesh and of spherical shape of similar shape are preferable. The above mentioned inorganic fillers such as alumina and Ottawa sand, and the organic fillers like phenol resin spheres and epoxy resin spheres can be used.

When it is intended to make a mold to which accurate pore diameter and porosity are essential, the object can be realized by using a filler having a certain range of particle size and a spherical or similar shape independently, or several kinds of such fillers together. The preferred quantity of filler to be added is 30-75 weight percent of all the mixture for molding.

The raw materials as described above are mixed to prepare the aqueous epoxy resin mixture, which is used for molding.

To eliminate the bubbles formed when the raw materials are stirred, a defoaming agent having a defoaming or foam breaking function is used as required. To make molded articles which have intricate and detailed patterns on the surface, a defoaming agent may be applied to the mold in advance so as to prevent foaming on the parts of the intricate and detailed patterns. Defoaming agents of the silicone series, non-silicone series, and for water emulsion are available. It is preferable, however, to use isoamyl alcohol or Contrasspum (by Schwegann).

A porous resin mold containing continuous holes can be made by casting the above described molding material, then by gelling, by heating and completely curing simultaneously with evaporation.

The porous resin mold has homogeneous and continuous pores, stable dimensions, good mechanical properties and durability, and is resistant to water. Moreover, it is possible to obtain a mold of high resistance to chemicals, to heat and of high incombustibility by selecting the type of epoxy compound adequately as described above, to obtain a mold of accurate pore diameter and porosity by selecting the quantity of added water and the type of filler, and to make the manufacturing time shorter by gelling the molding material in a shorter time through adequate selection of the hardener, so as to improve heat resistance.

Further description is now given referring to some examples of embodiments, of comparison and of reference.

For embodiments 1-11, the raw materials are used in the compound ratio shown in Table 1.

The epoxy compound and the emulsifier, however, are mixed in advance. In the Table, the epoxy compound A is a mixture of 85 parts by weight of

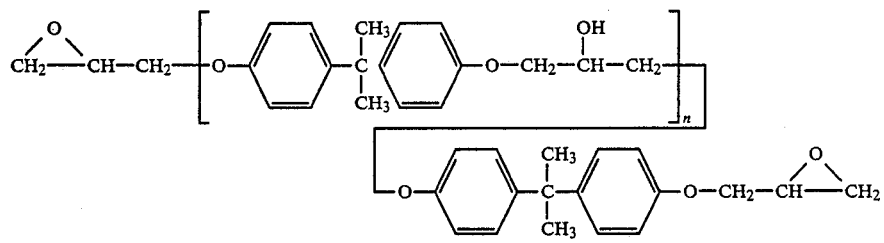

and 15 parts by weight of glycidyl ether, epoxy compound B is a mixture of 85 parts by weight of the foregoing epoxy compound and 15 parts by weight of trimethylolpropane-triglycidyl ether (by Kyoueisha Yushi Co., Ltd.), emulsifier A is a mixture of 40 parts by weight of polyoxyethylene oleyl ether and 60 parts by weight of polyoxyethylene sorbitan mono-oleate, emulsifier B is a mixture of 25 parts by weight of polyoxyethylene oleylether, 60 parts by weight of polyoxyethylene sorbitan monooleate, and 15 parts by weight of sorbitan mono-oleyate, hardener A is a reactant of 50 parts by weight of aliphatic polyamine, 30 parts by weight of glycidyl ether, and 20 parts by weight of polyphenol,

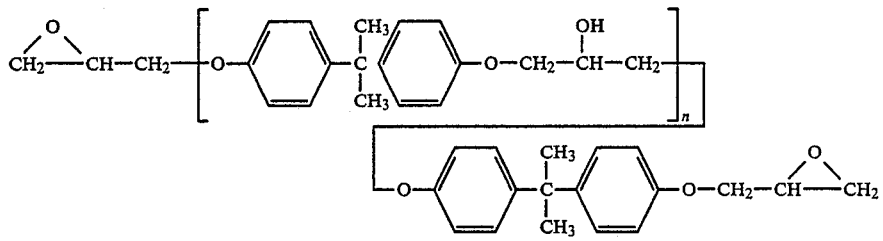

hardener B is a reactant of 25 parts by weight of aliphatic polyamine, 30 parts by weight of aromatic polyamine, 25 parts by weight of glycidyl ether, and 20 parts by weight of polyphenol, and hardener C is the reactant of 28 parts by weight of dicyandiamide, 30 units of aliphatic polyamine, 22 units of glycidyl ether, and 20 units of polyphenol. In the water-surface active agent, the ratio of surfactant is 5 wt. % (2.5 parts by weight in 50 parts by weight). As the surface active agent, fluorochemical surfactants derived from hexafluoropropane oligomer is used. The ceramic powder A is of 100–200 mesh particle size, ceramic powder A-2 is of 250 mesh or smaller particle size, silica sand A is spherical type of 80 mesh particle size, and silica sand B is spherical type of 300 mesh or smaller particle size.

In the embodiments 1 to 8, and 11, the porous resin molds containing continuous holes are made by the following method. First, the hardener is added to the mixture of epoxy compound and the emulsifier, then the mixture is stirred fully to make it into an even emulsion while gradually adding water or water-surface active agent. The filler is added to the emulsion, and an even mixture is made by full stirring, which is used as the molding material. The molding material is poured into a polystyrol container of $85 \times 85 \times 50$ mm (2 mm thick with a projection of 45 mm dia. and 7 mm height on the bottom, and a heat resistance of 70° C. Then the cover of the container is closed after adjusting exactly to a 50 mm height with a doctor blade. As shown in Table 1, gelation of the compound is completed in 25 to 45 minutes. After confirming the gelation, curing is advanced by heating at 50° C. for two hours. After cooling gradually down to room temperature, the molded article is demolded. A water adsorbing mold is obtained already at this point. After that, the mold is heated for 3 hours at 80° C. for full curing and evaporation to obtain a porous resin mold containing continuous holes.

In embodiments 9 and 10, the porous resin molds containing continuous holes are obtained in the same manner as for embodiments 1 to 8 except for the following curing conditions. In embodiment 9, gelation is carried out at 40° C., curing is advanced by heating for two hours at 60° C., then the article is released from the mold to be heated further for two hours at 80° C. and another three hours at 120° C. to complete curing. In embodiment 10, gelation is carried out at 45° C., curing is advanced by heating for three hours at 60° C., then the porousresin mold is demolded from the mold and heated further for one hour at 80° C., another hour at 100° C., still another two hours at 150° C. to complete curing. As shown in Table 1, the time of gelation for embodiment 1 to 11 is very short as the hardeners A-C are used.

For the examples for comparison 1 and 2, the raw materials are mixed at the compounding ratio shown in Table 2. However, is used as the epoxy compound, phenylglycidyl ether (PGC, epoxy resin diluent by Nippon Kayaku) as the diluent, a block copolymer of polyoxyethylene and polyoxypropylene as the emulsifier C and D, $HO(CH_2CH_2O)_l—[CH(CH_3)CH_2O]_m—(CH_2CH_2O)_nH$ as the emulsifier C, polyoxyethylene polyoxypropylene block polymer as the emulsifier D, and modified aliphatic polyamine as the hardener D respectively.

In both examples for comparison 1 and 2, the obtained compounds of raw materials are subjected to complete water release, and a porous resin mold containing continuous holes cannot be made.

In the example for reference, the mold is made via the following procedure by using plaster. Plaster of 100 parts by weight is added little by little to 75 units of 10 C water, then the mixture is stirred for five minutes with an agitator at about 300 rpm. Then the obtained compound is poured into a container in the same manner as for the embodiments of the invention and hardened for 5 days at normal temperature, and then the hardened article is used as the mold for reference.

The molds obtained by embodiments 1 to 11 were checked for such characteristics as water adsorption speed, shrinkage, average pore diameter, and heat deflection temperature. For the articles for example for comparison 1 and 2, measurement was not possible due to complete water release as mentioned above. The measurements were made in the following manner.

(1) Water adsorption

Dents made on the bottom of the mold were kept upward and 2 cc water was spread in the dents to measure the adsorption time of the water.

(2) Shrinkage

The value given by the following expression was calculated while taking the mold for reference stated above as the standard. Shrinkage (%)=(Volume of the mold of the embodiments/volume of the mold for reference with plaster)$\times 100$.

(3) Average pore diameter

A porosimeter was used for the measurement. The mechanical strength (mechanical properties) was checked further by the following method.

(4) Mechanical strength

By using a die of $100 \times 200 \times 50$ mm, porous resin molds were made by the methods of Embodiment 1 to 11, and the resulting molds were cut into test pieces to check mechanical strength. The compressive strength was measured with test pieces of $20 \times 20 \times 20$ mm and the bending strength was measured with test pieces of $40 \times 40 \times 160$ mm.

The tests results are shown in Table 1. The water adsorption property of the plaster mold for reference was 37 seconds.

TABLE 1

| | | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 | Embodiment 11 |
|---|---|---|---|---|---|---|---|---|---|---|---|---|
| | | (in weight unit) | | | | | | | | | | |
| Epoxy compound | A | 100 | 100 | 100 | 100 | 100 | 100 | 100 | — | — | — | 100 |
| | B | — | — | — | — | — | — | — | 100 | 100 | 100 | — |
| Emulsifier | A | 6 | 6 | 6 | 6 | 6 | 6 | 6 | — | — | — | 30 |
| | B | — | — | — | — | — | — | — | 8 | 8 | 8 | — |
| Hardener | A | 25 | 25 | 25 | 25 | 25 | 25 | 25 | 30 | — | — | 25 |
| | B | — | — | — | — | — | — | — | — | 30 | — | — |
| | C | — | — | — | — | — | — | — | — | — | 25 | — |
| Water | | 50 | 70 | 30 | 50 | — | 50 | — | — | — | — | 60 |
| Water-surface active agent | | — | — | — | — | 50 | — | 50 | 50 | 50 | 50 | — |
| Filler | | | | | | | | | | | | |
| Ceramic powder | A | 200 | 200 | 200 | — | — | — | — | — | — | — | — |
| | A-2 | — | — | — | 200 | — | — | — | — | — | — | — |
| Silica sand | A | — | — | — | — | 250 | — | 150 | — | — | — | 250 |
| | B | — | — | — | — | — | 170 | 50 | — | — | — | — |
| Zircon sand | | — | — | — | — | — | — | — | 500 | 500 | 500 | — |
| Gelation time (Minute) | | 30 | 45 | 25 | 30 | 30 | 30 | 30 | 25 | 45 | 45 | 45 |
| Water adsorption (sec.) | | 42 | 33 | 58 | 46 | 32 | 38 | 34 | 45 | 42 | 40 | 35 |
| Shrinkage (%) | | 99.88 | 100.02 | 99.57 | 99.92 | 99.54 | 100.08 | 99.87 | 100.08 | 99.96 | 99.52 | 98.92 |
| Compressive strength (kg/cm$^2$) | | 405 | 318 | 586 | 432 | 415 | 462 | 428 | 486 | 542 | 618 | 216 |
| Bending strength (kg/cm$^2$) | | 83 | 62 | 116 | 91 | 82 | 98 | 85 | 114 | 132 | 156 | 48 |
| Average pore diameter (micron) | | 1.05 | 1.57 | 0.43 | 0.62 | 2.15 | 1.24 | 1.56 | 0.85 | 0.88 | 0.92 | 1.32 |
| Heat deflection temp. (°C.) | | 52 | 48 | 54 | 52 | 54 | 53 | 53 | 60 | 98 | 124 | 38.5 |

TABLE 2

| | | Example for Comparison 1 | Example for comparison 2 |
|---|---|---|---|
| | | (in weight unit) | |
| Epoxy compound | | 100 | 100 |
| Diluent | | 20 | 20 |
| Emulsifier | C | 15 | — |
| | D | — | 15 |
| Hardener D | | 48 | 48 |
| Water | | 60 | 60 |
| Silica sand A | | 250 | 250 |

From Table 1, it is shown that the porous resin mold containing continuous holes obtained by embodiments 1–11 respectively have excellent mechanical characteristics and dimensional stability. The molds of embodiment 9 and 10 are highly resistive to heat as epoxy compounds having polyfunctional groups and heat resistive hardeners are used.

Regarding the method of making a porous resin mold containing continuous holes the casting method is applicable to produce a mold containing continuous and homogeneous pores of excellent dimensional stability, mechanical characteristics and durability because a hydrated epoxy resin compound is used; which contains an epoxy compound having at least one epoxy group in each molecule, hardener to react with the epoxy compound and to harden the epoxy compound, emulsifier made by mixing at least two kinds of three nonionic emulsifiers of HLB 4–8, 8–17, and 11–15.6 respectively, water or water-surface active agent solution, and filler.

This invention relates to a slip discharge casting comprising a hollow mold made by supplying a slip into a separable casting mold having continuous holes, by applying pressure to the slip to discharge the moisture content of the slip toward the outside of the casting mold, by adhering the solid matter of the slip onto the inner face of the casting mold, then by separating the casting mold. The casting mold can be produced by the process heretofore described, namely a porous resin mold containing continuous holes wherein the molding materials used are 20 to 50 parts by weight of hardener to 100 parts by weight epoxy compound, 30 parts by weight or less of emulsifier to 100 parts by weight of total epoxy compound and hardener, 1–200 parts by weight of water or water-surface active agent mixture, and 30–75 wt. % of filler in the compound for molding respectively.

The casting mold can be made suitable to the above described slip discharge casting method when provided with homogeneous and continuous holes, excellent dimensional stability, mechanical characteristics, durability, heat resistance and water resistance by using the molding materials in the specific ratio of compounding.

Except for the compounding ratio, the conditions described for the process of making the porous resin mold containing continuous holes are applicable.

The slip discharge casting is made by using a slip discharge casting equipment as shown, for example, in FIG. 1, and the casting mold of this invention is assembled in the slip discharge casting equipment as described in the following text. As shown in the drawing, the slip discharge casting equipment has a casting mold (1). The casting mold (1) is provided with a pressure resistive container (2) which can be separated into an upper container portion or hanger for a mold (2a) and other part or lower container portion (2b), and inner molds (filter layers) (3) (3') which can be divided into two parts when the pressure resistive portions 2a and 2b are parted. The upper and lower inner molds 3, 3' are provided inside the pressure resistive container (2) so as to form a casting space (4) of a desired shape. Water discharge channels (5) (5') having an opening at the outside of the pressure resistive container (2) are formed at an adequate spacing inside the inner molds (3) (3'). One end of a slip feed pipe (6) and an overflow pipe (7) is opened into said casting space (4), and the other end of the pipes (6) (7) is opened to the outside of the pressure resistive container (2). The hanger for mold (2a) of the pressure resistive container is fixed to struts (23, 23). The part (2b) is supported by lifting rods (24, 24) and can be moved up and down from the interlock position of the hanger for mold (2a) with the part (2b) to the stand-by position at the lower part of FIG. 1, shown by alternate long and two short dashes line in the drawing. In the drawing, (25) is an up-down driving means to drive the lifting rods (24), and (26) is a clamp to connect the outward flanges of the hanger (2a) and the part (2b) firmly at interlocking. For the casting equipment, the casting mold (1) is divided into two parts. However, it may also be possible to compose the upper part of the mold (2a) or the lower part (2b) of the pressure container so as to be divided into two or more parts. Said inner molds (3, 3') are made of the molding material having the specific compounding ratio described above and are provided with continuous pores. The water discharge channels (5, 5') are made of an extraporous material having far smaller water filtration resistance than that of the upper and lower inner molds (3, 3'). Pipes made of woven cotton of 2 to 20 mm outside diameter, for example, are used as the conductors forming channels 5,5'.

Figure 4:
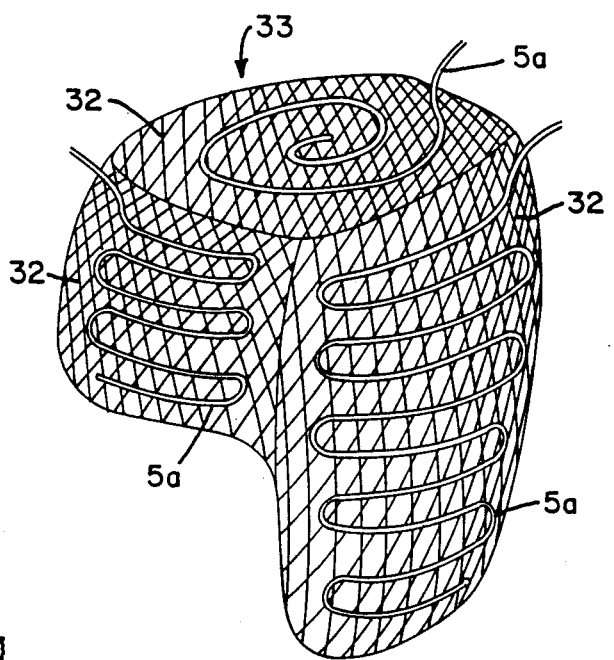
FIG. 4 is perspective view showing the discharge channel fixed onto a molded wire net.

The inner molds (3, 3') can be made, for example, by the following method. First, a wire net is pressed against the surface of a model molded larger than the casting mold by the distance between the surface of the inner molds (3, 3') and the discharge channels (5, 5') (40–100 mm for example) to obtain a wire net (32) (FIG. 4) shaped corresponding to the shape of the inner molds (3, 3'). Then one or more pipes for the discharge channels (5a) (FIG. 4) are placed onto the wire net (32) with an adequate spacing (5–100 mm pitch between the pipes, for example) and are fixed with an adequate means such as wire. The molding wire net (33) with pipe (5a) attached to it is housed into the upper part (2a) and the lower part 2b of the pressure container (2) of FIG. 1 respectively, then the end of the pipe (5a) for discharge channel forming is inserted into the pipeline of the external pipes (8, 8') (FIG. 1) respectively having an opening inside the pressure container (2). A corresponding part of the mold model of FIG. 4 is housed into the lower part (2b) of the pressure container, and the molding material of the specific compounding ratio described above, mixed into fluid form, is poured into the gap between the mold model of FIG. 4 and the part (2b), and then the molding material is cured. During curing the hanger for mold (2a) of the pressure container is interlocked with the part (2b) by members (26) and the molding material having the specific compounding ratio previously described, mixed into fluid form, is poured between the mold model of FIG. 4 and the hanger (2a) to be cured. After separating the pressure container (2) at the end, the mold model of FIG. 4 is removed and the inner molds (3, 3'), having the water discharge channels (5, 5') in the pressure container are completed and serve as casting molds.

Piping of each casting mold 3, 3' is arranged in the following way. An overflow tank (9) is connected to an overflow pipe (7) and incorporates a liquid level detector (10). A pipe with a 3-way valve (11) is connected to the top of the overflow tank. The 3-way valve (11) is opened to the outside at one end, and the other end is connected to an air compressor (not illustrated). The external pipes (8, 8')) connected to the discharge channels (5, (5')) are connected to air separators (12, (12').

Drain valves (13, (13')) and 3-way valves (14, (14')) are attached to the air separator (12, (12'). One end of each 3-way valve (14, (14')) is connected to an air compressor (not illustrated), and the other end is connected to a pressure reducer (not illustrated). The slip feed pipe (6) is connected to the valve (22) of a slip feed and discharge unit (15) through a flexible pipe (16). The flow inlet of a pump (18) is connected to the bottom of a slip storage tank (17), and a valve (19) connected to the discharge outlet of the pump (18) and a valve (21) is attached to a discharge slip return pipe (20) are connected to the valve (22) of the slip feed and discharge unit (15). The cart (27) is for carry-out of molded articles, provided with a table lifter (29) having a carry-out conveyor (28) attached to the surface, and is so composed as to move back and forth from the stand-by position (shown by the alternate long and two short dashes line in FIG. 3) to the receiving position (shown by a continuous lines in FIG. 3). A loading base (3) of the pallet type is placed on the carry-out conveyor (28).

Figure 2:
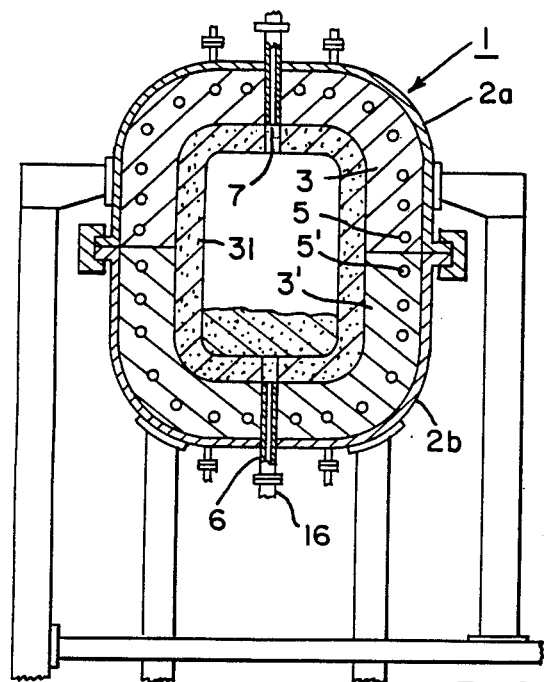
FIGS. 2 and FIG. 3 are sectional views of an embodiment of the molding method with the slip casting mold.

The slip discharge casting system is operated as follows. First the slip, pressurized by the pump (18), is supplied to the casting space (4) formed by interlocking the upper portion (2a) and the lower portion (2b) of the pressure container (2). Slip supply is conducted through the valves (19, 22), the flexible pipe (16) and the slip feed pipe (6). While the slip is supplied, the valve (11) is opened to the atmospheric air. When the supplied slip overflows from the overflow pipe (7) and goes up into the overflow tank (9), the liquid level detector (10) functions to stop the pump (18) and to close the valve (22). Then compressed air (5–15 kg/cm$^2$ for example) is supplied into the overflow tank (9) by operating the valve (11) to pressurize the slip in the casting space (4), and the valves (13, 13') are opened to turn the pressure in the air separators (12, 12') to atmospheric pressure, or the valves (13, 13') are closed and the valves (14, 14') are operated to turn the pressure in the air separators (12, 12') to a negative pressure condition (300–700 mmHg for example). By this operation, the solid matter in the pressurized slip in the casting space (4) is quickly deposited onto the surfaces of the inner molds (3, 3') as the moisture content in the slip goes out into the discharge channels (5, 5') of lower pressure through the inner molds (3, 3'). (Refer to FIG. 2). After the deposition of the solid slip for a specified time (about 9 minutes for 9 mm thickness for example), the valve (11) is operated to change the inside of the overflow tank to atmospheric pressure, and the valves (22, 21) are opened to return the extra slip solids not deposited in the casting space (4) to the slip tank (17) through the slip feed pipe (6), the flexible pipe (16), the valves (22, 21) and the slip return pipe (20). After discharging the slip, the valve (22) is closed as required and the valve (11) is operated to supply compressed air into the overflow tank (9), to pressurize the deposited wall from inside, and to reduce the moisture content of the deposited wall evenly. While the non-deposited slip is discharged and the deposited wall is again pressured, the inside of the air separators (12, 12') is kept at atmospheric or negative pressure by the operation as described above.

Figure 3:
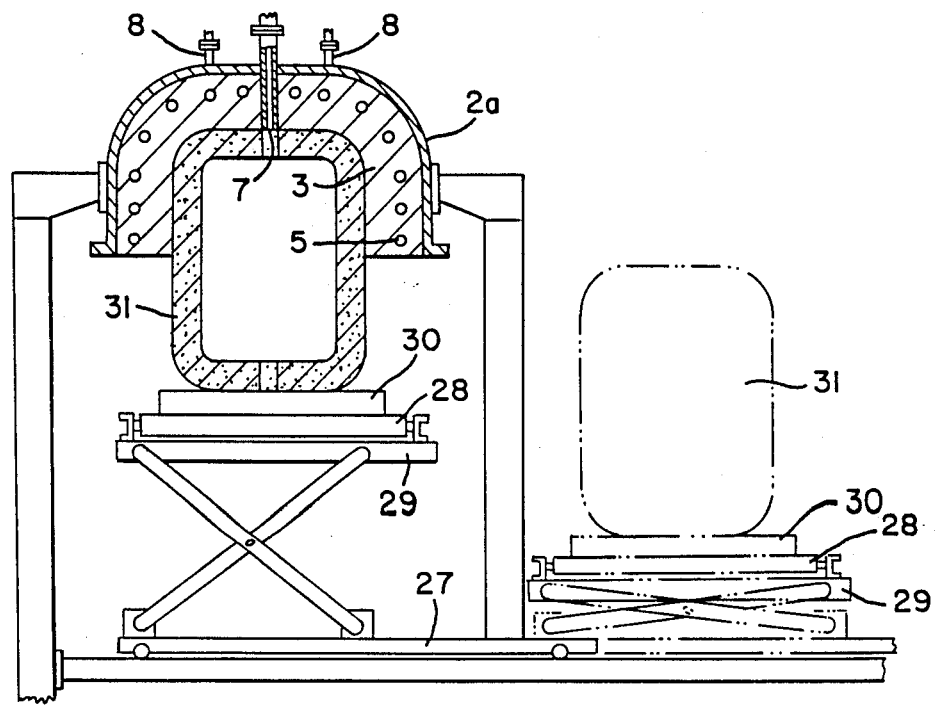

Then the inside of the air separator (12) is turned to a negative pressure condition, the valve (13') is closed, the valve (14') is operated to supply compressed air into the air separator (12'), the residual moisture in the inner mold (3') is pressed out to the boundary between the surface of the inner mold (3') and the deposited wall of the casting being made to form a water film, the lower part (2b) of the pressure container (2) is lowered to separate it from the upper part of the mold (2a), then the casting (31) is adhered to the inner mold (3) to be hung for holding as shown in FIG. 3. The mold cart (27) is moved to the lower part of the hanging mold (31), and the table lifter (29) is raised to put the loading base (30) closer to the bottom of the mold (31). By operating the valve (14), compressed air is supplied into the air separator (12) to pressurize the inside of the discharge channel (5), to squeeze out the residual water in the inner mold (3) to the boundary between the surface of the inner mold (3) and the cast mold (31), to form a water film, and to naturally drop the mold (31) onto the loading base (30). Finally, the table lifter (29) is lowered, the mold cart (27) is retracted to the stand-by position shown by the alternate long and two short dashes line in FIG. 3, and the hollow molded article (31) is placed on the loading base (30).

Being made of molding material having the specific compounding ratio described earlier, the inner molds of the slip discharge casting system have the advantages in that the inner molds are subjected to almost no curing shrinkage and their dimensional stability is excellent. When the casting mold is made by the method described above, therefore, gaps will be hardly formed between the mold and the pressure container, and leakage of slip material is less likely to occur through any gap formed at the fitting part of the inner molds. It is also possible to make the size or shape of the casting space to correspond exactly to the size and shape of the desired molded article. It is, therefore, possible to obtain a mold of the dimensional accuracy. The dimensional accuracy is excellent even when the molded articles have intricate shapes, and the dimensional dispersion can be very small even when the mold is used repeatedly. The inner molds can also be made highly durable and to have excellent water resistance, mechanical characteristics, wear resistance and chemical resistance, which makes it possible to make a great number of molds without fear of attack by chemicals, dissolution in water, or breakage. Since the inner molds can be provided with high heat resistance, breakage by heat can be minimized when the slip temperature is increased. Moreover, the shape and wall thickness of the molded product can be homogeneous because the inner molds can be provided with dimensional stability and with even and continuous holes.

When the inner molds are made of plaster, on the other hand, the following problems result. Plaster molds are inferior in wear resistance, strength, and chemical resistance. When used repeatedly, therefore, wear and corrosion by chemicals are experienced and strength is also reduced. When applied to slip discharge casting, therefore, plaster fails to make many products with a high dimensional accuracy, and the maximum number of products which can be molded is several hundred pieces only.

When inner molds are made by the methods described in the aforementioned Japanese Patent Publication No. 53-2464, No. 51-46131, No. 55-19723, or Provisional Publication No. 59-71339, the dimensional stability is lower due to curing shrinkage. Leakage of slip is, therefore, more likely to occur through gaps formed at the juncture of the inner molds to each other. As it is difficult to accurately make the size or shape of the casting space suitable to the size and shape of the desired mold, molded products of high dimensional accuracy can hardly be obtained. Breakage due to heat and other causes is also more likely since the heat resistance and durability of the inner molds are inferior to those of the inner molds made of the molding materials having the specific compounding ratios of this invention.

The following description is of an embodiment of a method for manufacturing a casting mold, using a casting mold of the invention as the inner mold.

Typical formulations for the inner molds are as follows:

|  | Parts by Weight |
| --- | --- |
| Resin component: Epoxy resin | 100 |
| Emulsifiers: | |
| Sorbitan aliphatic ester. | 8 |
| Polyoxyethylene Sorbitan oleyl ether. | 8 |
| Polyoxyethylene sorbitan aliphatic ester. | 8 |
| Hardener: Modified aliphatic polyamine (Hardener A described above). | products 30 |
| Filler: | |
| Ceramic powder | 220 |
| Water | 50 |

First, the resin component, hardener, emulsifiers, and water are mixed, then the fillers are added. The molding material is then prepared by fully mixing to fluid condition. A wire net is pressed against and onto the surface of a model molded larger than the casting mold product by the distance between the surface of the inner molds and the water discharge channels (5, 5') (70 mm) to prepare a wire net shaped to correspond to the shapes of the inner molds. Then, pipes for discharge channels of 7 mm outside diameter and made of woven cotton are placed on the wire net at a pitch of 35 mm and are fixed with wire. (See FIG. 4.) The wire net is housed inside the hanger 2a and the other part 2b, and the pipes for discharge channels are inserted into the pipe lines of the external piping of the pressure container. Then the corresponding parts of the molded model are housed into the hanger for the mold and the other part of the pressure container, then the molding material of this invention is poured into the gap between the mold model and the other part other than the molded article hanging part, and the temperature is kept at a level suitable for viscosity and gelation of the molding material (30°–55° C.). The condition is kept for the specified time to gel the molding material. Then the hardened material is heated gradually to remove water and emulsifiers from the cured material (from 35° C. to 70° C.), and to obtain complete porous inner molds. Then the molding material is poured into the gap between the molding model and the hanger for the mold, the material is cured in the same manner as above, and water and the emulsifiers are removed to obtain porous inner molds. Finally, the pressure vessel is separated to take out the molding model, and the inner molds having water discharge channels are completed in the pressure vessel to obtain a casting mold.

When molded products were made by using a slip casting system provided with the casting molds, the inner molds, were excellent in dimensional stability, durability, heat resistance and water resistance, which made it possible to manufacture more than 20,000 pieces of molded products of high dimensional accuracy continuously and without leakage of the slip.

We claim:

1. A method for making a porous resin mold containing continuous pores wherein the molding material is an epoxy resin mixture, the step comprising mixing together an epoxy compound having one or more epoxy groups in each molecule, a hardener which reacts with and hardens the epoxy compound, an emulsifier comprising at least two non-ionic emulsifiers selected from the group consisting of a sorbitan aliphatic acid ester having a hydrophile-lipophile balance value of about 4-8, a polyoxyethylene olevlether having a hydrophile-lipophile balance value of about 8-17, and a polyoxyethylene sorbitan aliphatic acid ester having a hydrophile-lipophile balance value of about 11-15.6, water and a filler.

2. A method in accordance with claim 1, wherein the emulsifier is mixed preliminarily with at least either one of the epoxy compound or the hardener.

3. A method as defined by claim 1, wherein the fillers contain substantially spherical particles.

4. A method as set forth in claim 1, wherein the filler is composed of particles classified in particle size.

5. A method according to claim 1, further comprising the step of applying a defoaming agent to a mold.

6. A method in accordance with claim 1 in which the molding material is heated after gelation of the material to remove water and emulsifiers therefrom and conduct further curing.

7. A method for making a porous resin mold containing continuous pores wherein the molding material is an epoxy resin mixture, the steps comprising:
mixing together an epoxy compound having one or more epoxy groups in each molecule and an emulsifier comprising at least two non-ionic emulsifiers selected from the group consisting of a sorbitan aliphatic acid ester having a hydrophile-lipophile balance value of about 4-8, a polyoxyethylene oleylether having a hydrophile-lipophile balance value of about 8-17, and a polyoxyethylene sorbitan aliphatic acid ester having a hydrophile-lipophile balance value of about 11-15.6;
adding to said mixture a hardener which reacts with and hardens the epoxy compound;
stirring the resulting epoxy compound emulsifiers and hardener into an even emulsion while adding water; and
adding a filler to said even emulsion while stirring.

8. A method according to claim 7 wherein said hardener comprises 20-50 parts by weight, said epoxy compound comprises about 100 parts by weight, said emulsifier comprises about 30 parts by weight or less, to about 100 parts by weight of total epoxy compound and hardener, about 1-200 parts by weight of water and 30-75 weight percent of filler in the mixture of molding.

9. A method according to claim 7 wherein a water solution of a fluorine containing surface active agent is added in place of water.

10. A method according to claim 9 wherein about 1-200 parts by weight of said solution is added.

11. A method according to claim 7 wherein at least two of said emulsifiers are added in a ratio such that the resulting emulsion has a hydrophile-lipophile balance value in the range of about 13 to about 14.5.

12. A method according to claim 7 wherein substantially the same weight quantity of said non-ionic emulsifiers is added.

13. A method according to claim 7 further comprising:
placing the molding material in a container;
permitting the molding material to gel in said container; and
curing the gelled molding material.

14. A method according to claim 13 wherein said curing is at about 50° C. for about 2 hours.

15. A method according to claim 13 further comprising:
demolding said cured molding material after cooling to room temperature; and
curing the demolded molding material.

16. A method according to claim 15 wherein said demolded molding material is cured for about 3 hours at about 80° C.

* * * * *